(12) United States Patent
Gao et al.

(10) Patent No.: US 12,225,841 B2
(45) Date of Patent: Feb. 18, 2025

(54) DEVICE AND METHOD FOR MEASURING AND CALIBRATING GROUND PRESSURE OF SEEDING DEPTH LIMITING WHEEL

(71) Applicant: JIANGSU UNIVERSITY, Zhenjiang (CN)

(72) Inventors: Yuanyuan Gao, Zhenjiang (CN); Peiying Li, Zhenjiang (CN); Mengfan Wang, Zhenjiang (CN); Xinhua Wei, Zhenjiang (CN); Qingzhen Zhu, Zhenjiang (CN); Dianzhe Zhao, Zhenjiang (CN); Aocheng Qi, Zhenjiang (CN); Yifei Yang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/570,637

(22) PCT Filed: Feb. 9, 2023

(86) PCT No.: PCT/CN2023/075134
§ 371 (c)(1),
(2) Date: Dec. 15, 2023

(87) PCT Pub. No.: WO2024/113491
PCT Pub. Date: Jun. 6, 2024

(65) Prior Publication Data
US 2024/0324494 A1    Oct. 3, 2024

(30) Foreign Application Priority Data
Nov. 28, 2022 (CN) .......................... 202211504004.4

(51) Int. Cl.
    G06F 7/70    (2006.01)
    A01C 5/06   (2006.01)
    A01C 7/20   (2006.01)

(52) U.S. Cl.
    CPC .............. *A01C 7/205* (2013.01); *A01C 5/062* (2013.01); *A01C 7/203* (2013.01)

(58) Field of Classification Search
    CPC ......... A01C 7/205; A01C 5/062; A01C 7/203; B62J 43/13; B62J 45/20; B62M 25/28;
    (Continued)

(56) References Cited

U.S. PATENT DOCUMENTS

2011/0313572 A1* 12/2011 Kowalchuk ............ A01C 7/205
                                                  111/164
2023/0041214 A1*  2/2023 Bassett .................. A01C 7/205

FOREIGN PATENT DOCUMENTS

CN        105103722 A     12/2015
CN        207529146 U      6/2018
(Continued)

*Primary Examiner* — Adam M Alharbi
(74) *Attorney, Agent, or Firm* — Bayramoglu Law Offices LLC

(57) ABSTRACT

A device for measuring and calibrating the ground pressure of the seeding depth limiting wheels includes: a main body, connected to a pair of depth limiting wheels; a pressure adjusting member, arranged on the main body and configured to adjust a pressure of the depth limiting wheels to ground; a pressure sensor, arranged on the main body and configured to detect an actual pressure output by the pressure adjusting member; and a pressure acquisition calibrator, configured to detect a ground pressure applied by the depth limiting wheels on ground; and automatically fit a plurality of actual pressures and a plurality of ground pressures to establish a model for measuring ground pressure of a pair of depth limiting wheels. The device can automatically acquire a plurality of actual pressures and a plurality of ground
(Continued)

pressures to establish a model for measuring ground pressure of a pair of depth limiting wheels.

16 Claims, 5 Drawing Sheets

(58) Field of Classification Search
CPC ..... B62M 9/123; B62M 25/08; G01C 22/002; G01P 1/07; G01P 3/50
See application file for complete search history.

(56) References Cited

FOREIGN PATENT DOCUMENTS

| | | | |
|---|---|---|---|
| CN | 113179715 | A | 7/2021 |
| CN | 115226445 | A | 10/2022 |
| KR | 101840282 | B1 | 3/2018 |

* cited by examiner

DEVICE AND METHOD FOR MEASURING AND CALIBRATING GROUND PRESSURE OF SEEDING DEPTH LIMITING WHEEL

CROSS REFERENCE TO THE RELATED APPLICATIONS

This application is the national phase entry of International Application No. PCT/CN2023/075134, filed on Feb. 9, 2023, which is based upon and claims priority to Chinese Patent Application No. 202211504004.4, filed on Nov. 28, 2022, the entire contents of which are incorporated herein by reference.

TECHNICAL FIELD

The present disclosure relates to the technical field of agricultural seeding, and particularly to a device and a method for measuring and calibrating ground pressure of a pair of seeding depth limiting wheels.

BACKGROUND

Co-located profiling is the main structural form of conventional no-till seeders. In this structural form, two depth limiting wheels are symmetrically arranged on two sides of the furrow opener, to reduce the impact of furrow profiling on the consistency of sowing depth. The ground pressure of the seeding depth limiting wheels is a key indicator for evaluating seeding quality and directly affects the compactness of the arrangement of soil particles in the seed furrows. Relevant studies have shown that there is a close relationship between the ground pressure of the seeding depth limiting wheels and the soil solidity. Suitable soil solidity is conducive to water storage and moisture conservation in the seed bed, and promotes sprouting. Accurate measurement of the ground pressure of the seeding depth limiting wheels helps improve the accuracy of the control of ground pressure of sowing units, thereby achieving reasonable control of seed bed solidity, maximizing sowing quality, and promoting crop yield increase.

A pressure sensor is usually used to collect the ground pressure of the sowing unit. The external dimensions of the pressure sensor vary with different structural forms of different sowing units, resulting in changes in the ground pressure measurement model of the depth limiting wheels. Conventional methods mostly use manual recording and manual fitting to complete the calibration of the corresponding sensor and the construction of a pressure measurement model, and are labor-intensive and time-consuming. In addition, there is a lack of effective automated devices to meet the requirements for rapid calibration and accurate modeling of sensors for measuring the ground pressure of the depth limiting wheels in mass production.

SUMMARY

The present disclosure provides a device and a method for measuring and calibrating ground pressure of a pair of seeding depth limiting wheels, to resolve the defect that calibration methods involving manual recording and manual fitting in the prior art cannot meet the requirements of rapid calibration and accurate modeling of ground pressure of a pair of depth limiting wheels in a mass production mode.

The present disclosure provides a device for measuring and calibrating ground pressure of a pair of seeding depth limiting wheels, which includes: a main body, connected to a pair of depth limiting wheels; a pressure adjusting member, arranged on the main body and configured to adjust a pressure of the depth limiting wheels to a ground; a pressure sensor, arranged on the main body and configured to detect actual pressures output by the pressure adjusting member; and a pressure acquisition calibrator, arranged below the depth limiting wheels and abutting against the depth limiting wheels, and configured to detect ground pressures applied by the depth limiting wheels on the ground, and adjust the actual pressures output by the pressure adjusting member, where the pressure acquisition calibrator is electrically connected to the pressure sensor, and the pressure acquisition calibrator is further configured to store and automatically fit a plurality of the actual pressures and a plurality of the ground pressures to establish a model for measuring the ground pressure of the seeding depth limiting wheels.

In the device for measuring and calibrating the ground pressure of the seeding depth limiting wheels according to the present disclosure, the pressure acquisition calibrator includes: a weighing sensor, configured to detect the ground pressure applied by the depth limiting wheels on the ground; and a processor, electrically connected to the weighing sensor and the pressure sensor, and configured to adjust an output pressure of the pressure adjusting member, and store and automatically fit the plurality of the actual pressures and the plurality of the ground pressures to establish the model for measuring the ground pressure of the seeding depth limiting wheels.

In the device for measuring and calibrating the ground pressure of the seeding depth limiting wheels according to the present disclosure, the processor includes a signal amplifying circuit, an analog-to-digital (A/D) acquisition module, and a single chip microcomputer electrically connected in sequence, where the signal amplifying circuit is electrically connected to the weighing sensor.

The device for measuring and calibrating the ground pressure of the seeding depth limiting wheels according to the present disclosure further includes: a profiling four-link mechanism, hingedly connected to the main body, where one end of the pressure adjusting member is connected to the main body, and an other end of the pressure adjusting member is hingedly connected to the profiling four-link mechanism; and a levelness detector, arranged on the profiling four-link mechanism, and configured to detect an inclination angle between the profiling four-link mechanism and a horizontal plane.

The device for measuring and calibrating the ground pressure of the seeding depth limiting wheels according to the present disclosure further includes a lifting mechanism, arranged between the depth limiting wheels and the pressure acquisition calibrator, and configured to adjust the inclination angle between the profiling four-link mechanism and the horizontal plane.

In the device for measuring and calibrating the ground pressure of the seeding depth limiting wheels according to the present disclosure, the lifting mechanism includes: a bearing plate, located below the depth limiting wheels and abutting against the depth limiting wheels; a pair of slide rails, located below the bearing plate; a pair of X-shaped brackets, where a first end of each of the X-shaped brackets is connected to the bearing plate, a second end of each of the X-shaped brackets is connected to one of sliders, and the sliders are slidably connected to the slide rails; and a pair of cylinders, where a first end of each of the cylinders is connected to one of the sliders, and a second end of each of the cylinders is connected to one of the X-shaped brackets, to adjust an inclination angle between the bearing plate and the horizontal plane.

The device for measuring and calibrating the ground pressure of the seeding depth limiting wheels according to the present disclosure further includes a furrow opener, connected to the main body and located between the pair of depth limiting wheels.

In the device for measuring and calibrating the ground pressure of the seeding depth limiting wheels according to the present disclosure, the bearing plate is provided with a hollow groove, and the furrow opener partially runs through the hollow groove and extends to below the bearing plate, so that the furrow opener is in a suspended state.

The present disclosure also provides a method for measuring and calibrating ground pressure of a pair of seeding depth limiting wheels by using the device for measuring and calibrating the ground pressure of the seeding depth limiting wheels, the method including: adjusting the output pressure of the pressure adjusting member at a preset time interval; acquiring a plurality of the actual pressures of the pressure adjusting member and a plurality of the ground pressures applied by the depth limiting wheels on a ground; and storing the plurality of actual pressures and the plurality of ground pressures in an array form, and performing data fitting to establish a model for measuring the ground pressure of the seeding depth limiting wheels.

In the method for measuring and calibrating the ground pressure of the seeding depth limiting wheels according to the present disclosure, before the step of adjusting the output pressure of the pressure adjusting member at the preset time interval, the method further includes: controlling the lifting mechanism to operate, so that the inclination angle between the profiling four-link mechanism and the horizontal plane is 0°.

With the arrangement of the pressure adjusting member, the pressure sensor, and the pressure acquisition calibrator, the device for measuring and calibrating the ground pressure of the seeding depth limiting wheel according to the present disclosure can automatically acquire a plurality of actual pressures and a plurality of ground pressures to establish a model for measuring ground pressure of a depth limiting wheel, thereby avoiding the problems of high labor intensity of operation personnel, long time consumption, low efficiency and poor accuracy caused by manual recording and manual fitting.

BRIEF DESCRIPTION OF THE DRAWINGS

In order to more clearly explain the technical solutions in the present disclosure or in the prior art, the drawings used in the description of the embodiments or the prior art will be briefly described below. Obviously, the drawings depicted below are embodiments of the present disclosure, and those skilled in the art can obtain other drawings based on these drawings without any creative efforts.

LIST OF REFERENCE NUMERALS

10: pressure adjusting member; 20: depth limiting wheel; 30: fixing member; 40: pressure acquisition calibrator; 41: display screen; 50: lifting mechanism; 51: bearing plate; 52: X-shaped bracket; 53: slide rail; 54: cylinder; 55: hydraulic pump; 56: slider; 60: profiling four-link mechanism; 70: levelness detector; 80: furrow opener; 100: main body; 501: motor; 502: first lead screw; 503: commutator; 504: second lead screw; 511: hollow groove.

DETAILED DESCRIPTION OF THE EMBODIMENTS

To make the objectives, technical solutions and advantages of the present disclosure clearer, the technical solutions in the present disclosure will be described clearly and thoroughly with reference to the accompanying drawings in of the present disclosure. Apparently, the embodiments described are merely some embodiments, rather than all of the embodiments of the present disclosure. All other embodiments obtained by a person of ordinary skill in the art without creative efforts based on the embodiments of the present disclosure shall fall within the protection scope of the present disclosure.

The features defined by the terms such as "first" and "second" in the specification and claims of the present application may explicitly or implicitly include one or more features. In the description of the present disclosure, "multiple" and "a plurality of" mean two or more, unless otherwise particularly defined.

A device and method for measuring and calibrating ground pressure of a pair of seeding depth limiting wheels of the present disclosure will be described below with reference to FIG. 1 to FIG. 7.

Figure 1:
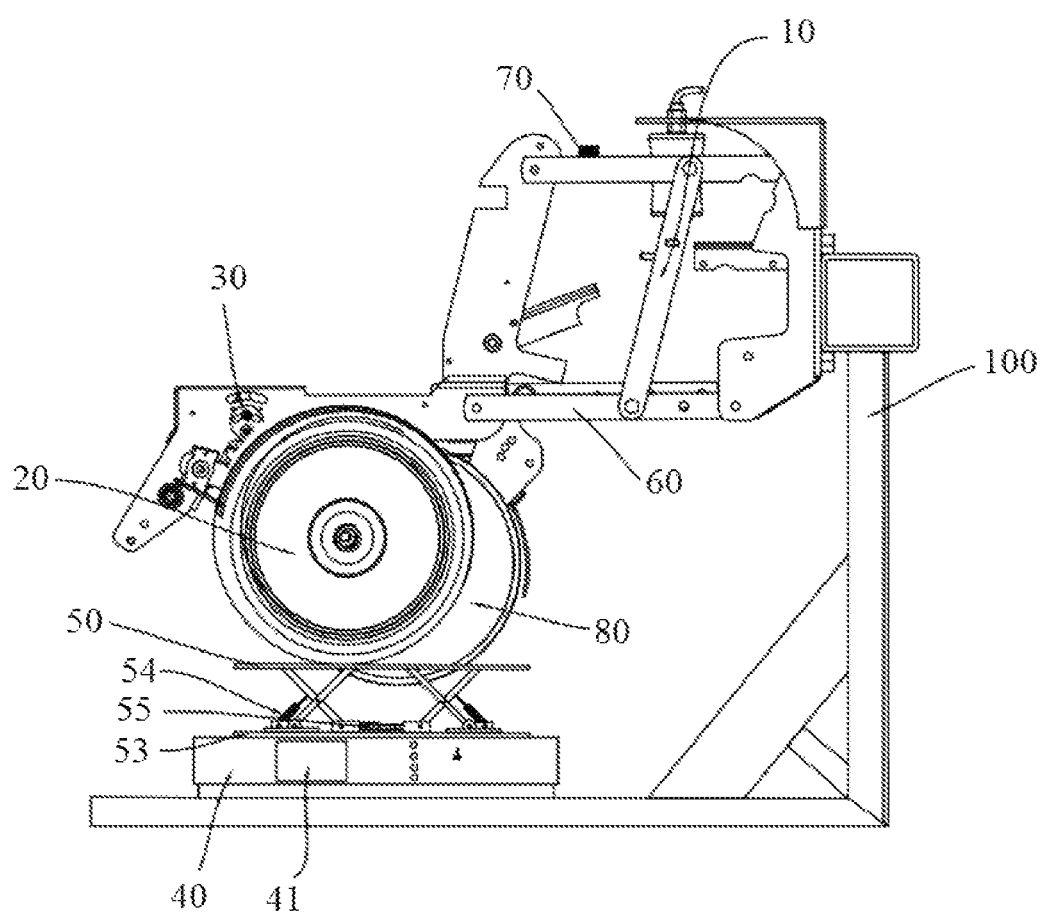
FIG. 1 is a front view of a device for measuring and calibrating ground pressure of a pair of seeding depth limiting wheels according to the present disclosure.
Figure 2:
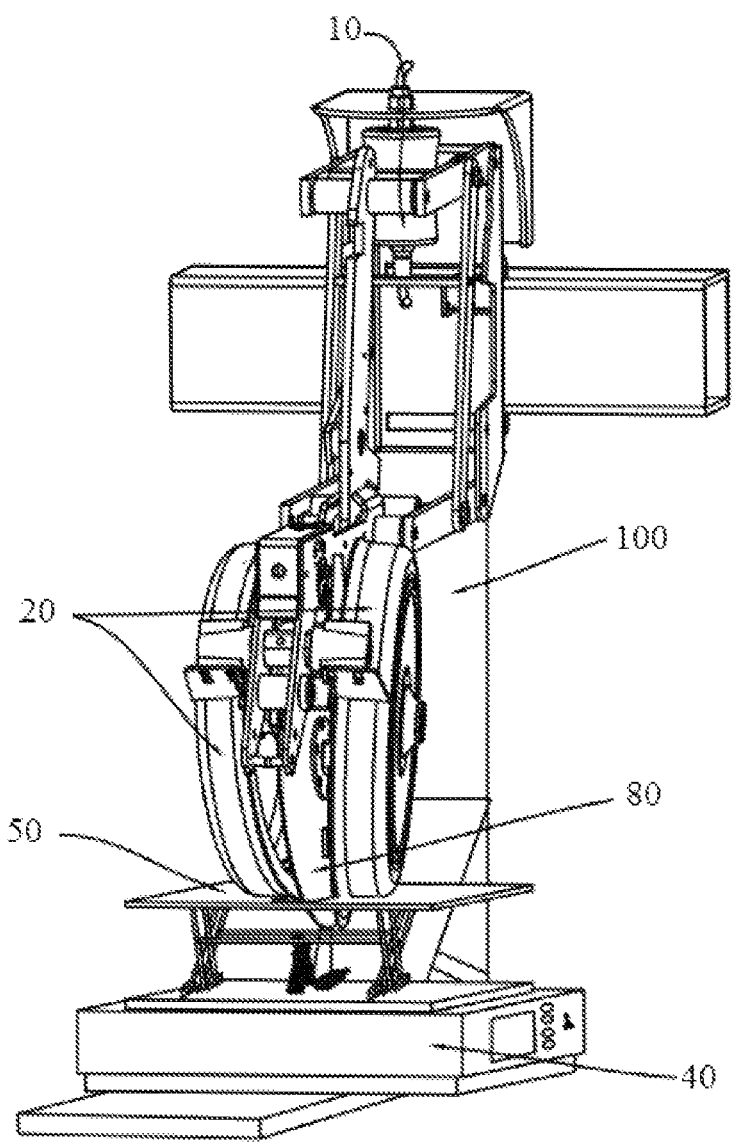
FIG. 2 is a side view of a device for measuring and calibrating ground pressure of a pair of seeding depth limiting wheels according to the present disclosure.

As shown in FIG. 1 and FIG. 2, in an embodiment of the present disclosure, the device for measuring and calibrating the ground pressure of the seeding depth limiting wheels includes a main body 100, a pressure adjusting member 10, a depth limiting wheel 20, a pressure sensor, and a pressure acquisition calibrator 40. A pair of depth limiting wheels 20 are connected to the main body 100. The pressure adjusting member 10 is arranged on the main body 100, and the pressure adjusting member 10 is configured to adjust a pressure of the depth limiting wheels 20 to ground. The pressure sensor is arranged on the main body 100 and configured to detect an actual pressure output by the pressure adjusting member 10. The pressure acquisition calibrator 40 is arranged below the depth limiting wheels 20 and abuts against the depth limiting wheels 20. The pressure acquisition calibrator 40 is electrically connected to the pressure sensor. The pressure acquisition calibrator 40 is configured to adjust an actual pressure output by the pressure adjusting member 10. The pressure acquisition calibrator 40 is further configured to detect a ground pressure applied by the depth limiting wheels 20 on ground. The pressure acquisition calibrator 40 is further configured to store and automatically fit a plurality of actual pressures and a plurality of ground pressures to establish a model for measuring the ground pressure of the depth limiting wheels 20.

Specifically, the pressure adjusting member 10 is arranged on the main body 100. That the pressure acquisition calibrator 40 is configured to adjust the actual pressure output by the pressure adjusting member 10. Specifically included is that the pressure acquisition calibrator 40 may adjust the actual pressure output by the pressure adjusting member 10 according to a preset time interval. The actual pressure output by the pressure adjusting member 10 is transmitted to the depth limiting wheels 20, and then transmitted by the depth limiting wheels 20 to the ground. The pressure applied by the depth limiting wheels 20 on the ground can be adjusted by adjusting the actual pressure output by the pressure adjusting member 10, to ensure that the furrow opener can reach an appropriate furrow depth for different soil hardness environments. In this embodiment, the pressure sensor is configured to collect the actual pressure output by the pressure adjusting member 10 and send the collected data to the pressure acquisition calibrator 40. The pressure acquisition calibrator 40 is arranged below the depth limiting wheels 20. A weighing sensor is arranged in the pressure acquisition calibrator 40. The weighing sensor is configured to detect the ground pressure applied by the depth limiting wheels 20 on the ground. The pressure acquisition calibrator 40 stores a plurality of actual pressures and a plurality of ground pressures, establishes a pressure sensor calibration equation by defining the plurality of actual pressures and the plurality of ground pressures as two arrays and performing data fitting using a least squares method, and displays key parameters in the established equation in real time, thereby obtaining a model for measuring ground pressure of a depth limiting wheel.

Optionally, in an embodiment of the present disclosure, the pressure adjusting member 10 may be an electric push rod, a pneumatic spring, a hydraulic cylinder, an electromagnetic damper, or the like.

It should be noted that in this embodiment, the electrical connection may be wired connection or wireless communication connection.

With the arrangement of the pressure adjusting member, the pressure sensor, and the pressure acquisition calibrator, the device for measuring and calibrating the ground pressure of the seeding depth limiting wheels according to the embodiment of the present disclosure can automatically acquire a plurality of actual pressures and a plurality of ground pressures to establish a model for measuring ground pressure of a pair of depth limiting wheels, thereby avoiding the problems of high labor intensity of operation personnel, long time consumption, low efficiency and poor accuracy caused by manual recording and manual fitting.

Further, in an embodiment of the present disclosure, the pressure acquisition calibrator 40 includes a weighing sensor and a processor. The weighing sensor is configured to detect the ground pressure applied by the depth limiting wheels 20 on the ground. The processor is electrically connected to the weighing sensor and the pressure sensor, and configured to adjust an output pressure of the pressure adjusting member 10. The processor is further configured to store and automatically fit the plurality of actual pressures and the plurality of ground pressures to establish the model for measuring ground pressure of a pair of depth limiting wheels.

Specifically, the processor includes a signal amplifier, an analog-to-digital (A/D) acquisition module, and a single chip microcomputer. The weighing sensor may collect the ground pressure of the depth limiting wheels 20 in real time at a frequency. The weighing sensor detects and collects the ground pressure of the depth limiting wheels 20 by using the force measuring principle of a strain gauge. The ground pressure data is transmitted to the single chip microcomputer after being subjected to gain processing by the signal amplifier and conversion by the A/D acquisition module. The single chip microcomputer collects a feedback value of the pressure sensor and the ground pressure of the depth limiting wheels in real time by changing the actual pressure output by the pressure adjusting member 10, automatically fits a plurality of actual pressures and a plurality of ground pressures to establish a pressure sensor calibration equation, and displays the key parameters in the established equation in real time, thereby obtaining a model for measuring ground pressure of a pair of depth limiting wheels, and greatly improving the accuracy and convenience of the model for measuring ground pressure of a pair of depth limiting wheels.

Further, the pressure acquisition calibrator 40 is further equipped with a display screen 41. The display screen 41 is configured to display the actual pressure, the ground pressure, the key parameters of the calibration equation, etc.

As shown in FIG. 1, in an embodiment of the present disclosure, the device for measuring and calibrating the ground pressure of the seeding depth limiting wheel further includes a profiling four-link mechanism 60 and a levelness detector 70. The profiling four-link mechanism 60 is hingedly connected to the main body 100. One end of the pressure adjusting member 10 is connected to the main body 100, and an other end of the pressure adjusting member 10 is hingedly connected to the profiling four-link mechanism 60. The levelness detector 70 is arranged on the profiling four-link mechanism 60, and configured to detect an inclination angle between the profiling four-link mechanism 60 and a horizontal plane.

Specifically, the profiling four-link mechanism 60 is located above the depth limiting wheels 20. The profiling four-link mechanism 60 includes a pair of upper arms and a pair of lower arms. The levelness detector 70 may be arranged on the upper arm or the lower arm of the profiling four-link mechanism 60 to detect whether the profiling four-link mechanism 60 is inclined relative to the horizontal plane. In this embodiment, the levelness detector 70 is fixed to the upper arm of the profiling four-link mechanism 60 to detect an inclination angle between the upper arm and the horizontal plane. When the upper arm is inclined relative to the horizontal plane, the position and posture of the profiling four-link mechanism 60 should be adjusted so that the included angle between the profiling four-link mechanism 60 and the horizontal plane is 0°, to prevent the pressure output from the pressure adjusting member 10 from being decomposed during the transmission to the depth limiting wheel 20 to affect the measurement accuracy of the pressure acquisition calibrator 40.

Optionally, in this embodiment, the levelness detector 70 may be an angle sensor, an inclination sensor, a leveling instrument, or the like.

As shown in FIG. 1, in an embodiment of the present disclosure, the device for measuring and calibrating the ground pressure of the seeding depth limiting wheel further includes a lifting mechanism 50. The lifting mechanism 50 is arranged between the depth limiting wheels 20 and the pressure acquisition calibrator 40. The lifting mechanism 50 is configured to adjust the inclination angle between the profiling four-link mechanism 60 and the horizontal plane, to ensure that the actual pressure output by the pressure adjusting member 10 will not be decomposed, thereby ensuring the measurement accuracy of the pressure acquisition calibrator 40.

Figure 3:
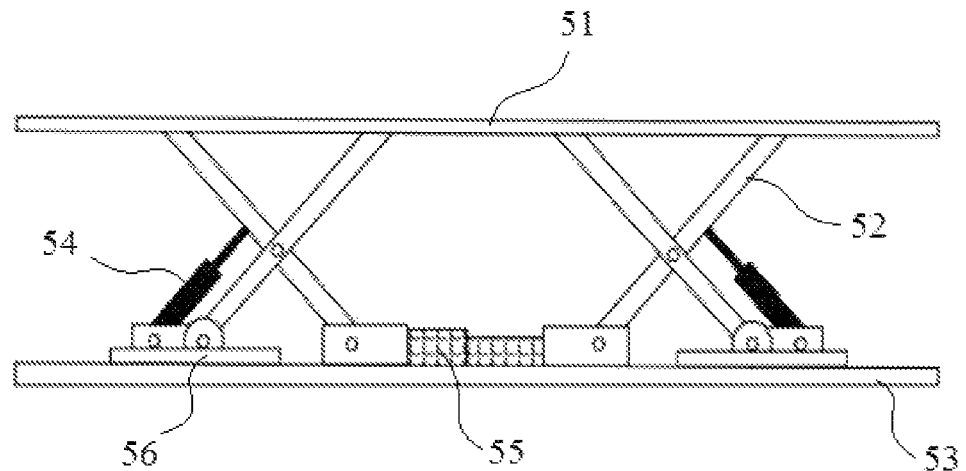
FIG. 3 is a first schematic structural diagram of a lifting mechanism shown in FIG. 1.

Further, as shown in FIG. 3, in this embodiment, the lifting mechanism 50 includes a bearing plate 51, a pair of X-shaped brackets 52, a pair of slide rails 53, cylinders 54, and sliders 56. The bearing plate 51 is located below the depth limiting wheels 20 and abuts against the depth limiting wheels 20. The pair of slide rails 53 are located below the bearing plate 51. A first end of each of the X-shaped brackets 52 is connected to the bearing plate 51. A second end of each of the X-shaped brackets 52 is connected to one slider 56. The slider 56 is slidably connected to the slide rails 53. A first end of the cylinder 54 is connected to the slide block 56, and a second end of the cylinder 54 is connected to the X-shaped bracket 52.

Specifically, the X-shaped bracket 52 includes two legs hingedly connected in a crossing manner. A first end of each leg is connected to a bottom surface of the bearing plate 51, and a second end of each leg is connected to the slider 56. The slider 56 is arranged in the slide rails 53 and is slidable along the slide rails 53. Each X-shaped bracket 52 is connected to one cylinder 54, and two ends of the cylinder 54 are connected to the slider 56 and one of the legs, respectively. The inclination angle between the bearing plate 51 and the ground can be adjusted by adjusting the expansion and contraction of the two cylinders 54 separately. Specifically, when the ground is uneven, the expansion and contraction of the two cylinders 54 are adjusted separately to make the bearing plate 51 horizontal, so that the profiling four-link mechanism 60 is horizontal, to ensure the measurement accuracy of the pressure acquisition calibrator 40

Further, the lifting mechanism 50 also includes a hydraulic pump 55. The hydraulic pump 55 is connected to the cylinders 54 to drive the cylinders 54 to expand or contract.

Figure 4:
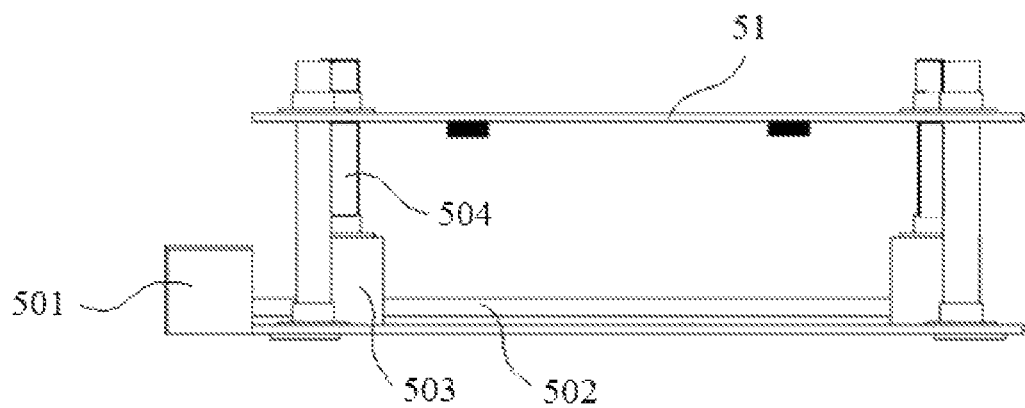
FIG. 4 is a second schematic structural diagram of the lifting mechanism.

Optionally, as shown in FIG. 4, in another embodiment of the present disclosure, the lifting mechanism 50 includes a bearing plate 51, a motor 501, a first lead screw 502, a commutator 503, and a second lead screw 504. A forward or reverse rotation of the motor 501 can drive the first lead screw 502 to rotate. The commutator 503 is configured to convert a horizontal linear motion of the first lead screw 502 to a vertical linear motion of the second lead screw 504. The bearing plate 51 is sleeved outside the second lead screw 504. A rotation of the second lead screw 504 can drive the bearing plate 51 to move in a vertical direction. Further, in this embodiment, the lifting mechanism includes two commutators 503 and two second lead screws 504. The two second lead screws 504 are located at two ends of the bearing plate 51. When rotational speeds of the two second lead screws 504 are different, lifting speeds of the two ends of the bearing plate 51 are different. When the ground is uneven, the rotational speeds of the two second lead screws 504 are adjusted to make the bearing plate 51 horizontal, so that the profiling four-link mechanism 60 is horizontal, to ensure the measurement accuracy of the pressure acquisition calibrator 40.

As shown in FIG. 1, in an embodiment of the present disclosure, the device for measuring and calibrating the ground pressure of the seeding depth limiting wheel further includes a furrow opener 80. The furrow opener 80 is connected to the main body 100 and located between the pair of depth limiting wheels 20.

Specifically, the furrow opener 80 is fixed on the main body 100 at an angle. The ground pressure of the depth limiting wheels 20 may be adjusted by changing the actual pressure output by the pressure adjusting member 10, to ensure that the furrow opener 80 can reach an appropriate furrow depth for different soil hardness environments.

Figure 5:
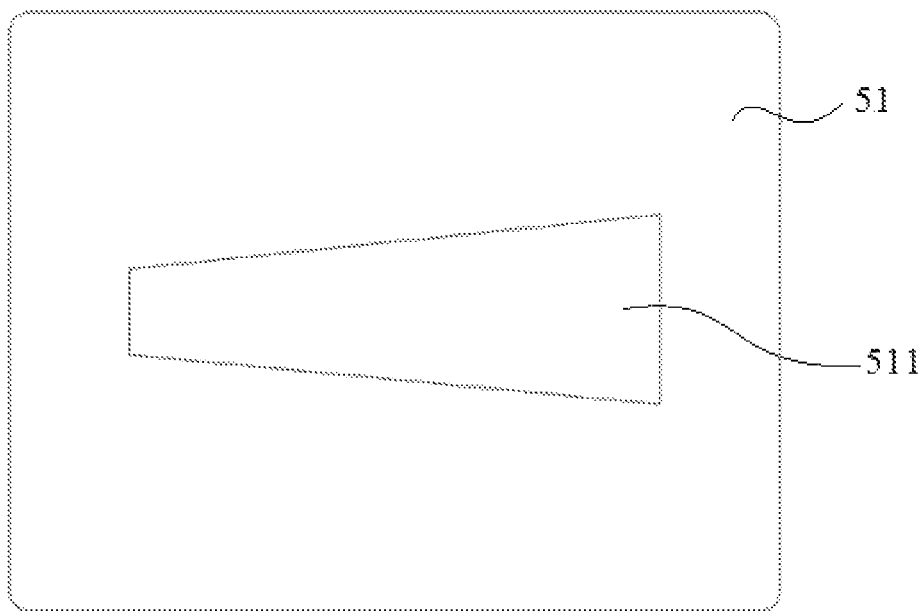
FIG. 5 is a schematic structural diagram of a bearing plate shown in FIG. 3.

As shown in FIG. 5, in an embodiment of the present disclosure, the bearing plate 51 is provided with a hollow groove 511. The furrow opener 80 partially runs through the hollow groove 511 and extends to below the bearing plate 51, so that the furrow opener 80 is suspended relative to the main body 100. In this way, the actual pressure output by the pressure adjusting member 10 completely acts on the depth limiting wheels 20, and the difference between the actual pressure and the ground pressure is reduced.

Figure 6:
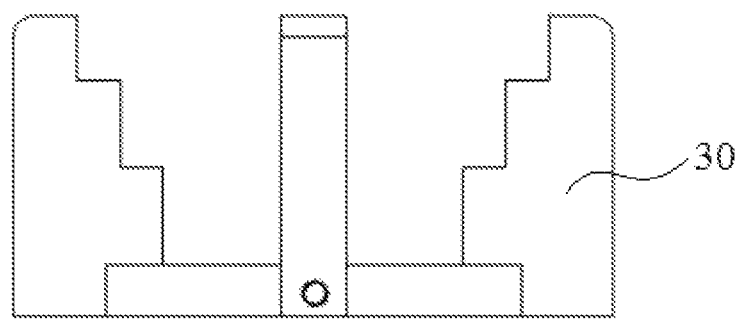
FIG. 6 is a front view of a fixing member shown in FIG. 1.
Figure 7:
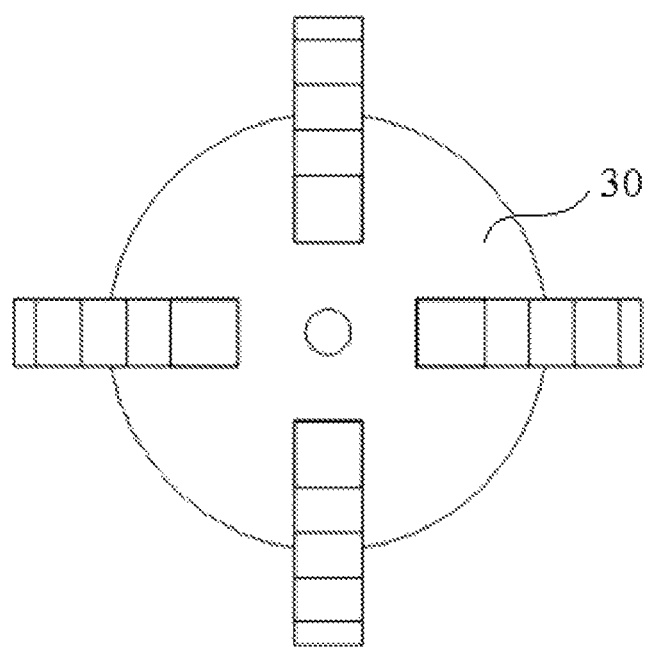
FIG. 7 is a top view of the fixing member shown in FIG. 1.

Further, as shown in FIG. 6 and FIG. 7, in an embodiment of the present disclosure, the device for measuring and calibrating the ground pressure of the seeding depth limiting wheel further includes a fixing member 30. The fixing member 30 is configured to fix the pressure sensor. The fixing member 30 is arranged on the main body 100 and at a position close to the depth limiting wheels 20. The fixing member 30 is a four-jaw chuck. A back of each pair of claws is configured to be tightened or loosened by a screw, to change the distance between the four-jaw chuck and the main body 100. Grasping forces of the two pairs of claws may be adjusted at the same time to fix the pressure sensor.

Further, in this embodiment, a side surface of each claw is stepped. When the stepped surfaces of two claws are arranged opposite to each other, a plurality of installation spaces with different sizes can be formed between a pair of claws, to allow for mounting of pressure sensors of different models, thereby improving the applicability of the device for measuring and calibrating the ground pressure of the seeding depth limiting wheels.

The device for measuring and calibrating the ground pressure of the seeding depth limiting wheels according to the embodiments of the present disclosure can adapt to pressure sensors of different specifications and models on the seeder, thereby improving the calibration and modeling efficiency saving time for the user. In addition, the detection accuracy of the weighing sensor is improved, laying a foundation for the subsequent precise regulation of seed bed solidity, to provide a good seed bed compaction environment which promotes the growth and development of seeds.

An embodiment of the present disclosure further provides a method for measuring and calibrating ground pressure of a pair of seeding depth limiting wheels by using the device for measuring and calibrating the ground pressure of the seeding depth limiting wheels, the method including the following steps.

In step 01, the output pressure of the pressure adjusting member 10 is adjusted at a preset time interval.

Specifically, the pressure acquisition calibrator 40 sends a signal to the pressure adjusting member 10 at the preset time interval to control the pressure adjusting member 10 to adjust the output actual pressure. It should be noted that in this embodiment, the preset time interval may be set according to a measurement requirement.

In step 02, a plurality of actual pressures of the pressure adjusting member 10 and a plurality of ground pressures applied by the depth limiting wheels 20 on ground are acquired.

Specifically, the actual pressure output by the pressure adjusting member 10 acts on the pressure sensor, and the pressure sensor sends the detected actual pressure to the pressure acquisition calibrator 40. A weighing sensor is arranged in the pressure acquisition calibrator 40. The weighing sensor detects the ground pressure applied by the depth limiting wheels 20 on the ground, and sends the detected data to the pressure acquisition calibrator 40.

In step 03, the plurality of actual pressures and the plurality of ground pressures are stored in an array form, and data fitting is performed to establish a model for measuring ground pressure of a pair of depth limiting wheels.

Specifically, after receiving and storing the plurality of actual pressures x and the plurality of ground pressures y, the pressure acquisition calibrator 40 obtains a curve through fitting according to the principle that a sum of distances between the curve and discrete points is the smallest, i.e., a total sum of squares is the smallest. A specific calculation formula is as follows:

$$S_{e^2} = \sum (f(x_i) - y_i)^2 = \sum (ax_i + b - y_i)^2$$

where x represents the actual pressure, y represents the ground pressure, and a and b are key parameters. Different values of a and b lead to different values of $S_{e^2}$. When a partial differential of a and b is equal to 0, $S_{e^2}$ has the smallest value.

For example, when the established model for measuring ground pressure of a pair of depth limiting wheels is a linear equation with one unknown, the corresponding values of a and b may be calculated by the following formula. For data fitting, fitting of a polynomial in one variable may be implemented using a method including but not limited to gradient descent, Gauss-Newton algorithm (i.e., iterative least squares), Levenberg-Marquardt algorithm, etc., which will not be detailed herein.

$$\hat{b} = \frac{\sum_{i=1}^{n} x_i y_i - n\overline{xy}}{\sum_{i=1}^{n} x_i^2 - n\overline{x}^2}$$

$$\hat{a} = \overline{y} - \hat{b}\overline{x}$$

The method for measuring and calibrating the ground pressure of the seeding depth limiting wheels according to the embodiment of the present disclosure can automatically acquire a plurality of actual pressures and a plurality of ground pressures to establish a model for measuring ground pressure of a pair of depth limiting wheels, thereby avoiding the problems of high labor intensity of operation personnel, long time consumption, low efficiency and poor accuracy caused by manual recording and manual fitting.

Further, in an embodiment of the present disclosure, before the step of adjusting the output pressure of the pressure adjusting member 10 at a preset time interval, the method for measuring and calibrating the ground pressure of the seeding depth limiting wheel further includes: controlling the lifting mechanism 50 to operate, so that the inclination angle between the profiling four-link mechanism 60 and the horizontal plane is 0°.

Specifically, before measurement and calibration, the cylinders 54 are controlled to operate to actuate the X-shaped brackets 52, to adjust the inclination angle between the bearing plate 51 and the ground, so that the profiling four-link mechanism 60 is in a horizontal state, to ensure that the actual pressure output by the pressure adjusting member 10 will not be decomposed during transmission, thereby ensuring the detection accuracy of the pressure acquisition calibrator 40.

Finally, it should be noted that the above embodiments are intended to illustrate, instead of limiting the technical solutions of the present disclosure. Although the present disclosure is described in detail by way of examples, it should be understood by those of ordinary skill in the art that modifications may be made to the technical solutions described in the embodiments, and equivalents may be substituted for some technical features, without essentially departing from the spirit and scope of the technical solutions described in the embodiments of the present disclosure.

What is claimed is:

1. A device for measuring and calibrating ground pressure of seeding depth limiting wheels, comprising:
   a main body, connected to a pair of the depth limiting wheels;
   a pressure adjusting member, arranged on the main body and configured to adjust a pressure of the depth limiting wheels to a ground;
   a pressure sensor, arranged on the main body and configured to detect actual pressures output by the pressure adjusting member;
   a pressure acquisition calibrator, arranged below the depth limiting wheels and abutting against the depth limiting wheels, and configured to detect ground pressures applied by the depth limiting wheels on the ground, and adjust the actual pressures output by the pressure adjusting member,
   wherein the pressure acquisition calibrator is electrically connected to the pressure sensor, and the pressure acquisition calibrator is further configured to store and automatically fit a plurality of the actual pressures and a plurality of the ground pressures to establish a model for measuring the ground pressure of the seeding depth limiting wheels; and
   a profiling four-link mechanism, hingedly connected to the main body, wherein one end of the pressure adjusting member is connected to the main body, and an other end of the pressure adjusting member is hingedly connected to the profiling four-link mechanism; and
   a levelness detector, arranged on the profiling four-link mechanism, and configured to detect an inclination angle between the profiling four-link mechanism and a horizontal plane.

2. The device for measuring and calibrating the ground pressure of the seeding depth limiting wheels according to claim 1, wherein the pressure acquisition calibrator comprises:
   a weighing sensor, configured to detect the ground pressure applied by the depth limiting wheels on the ground; and
   a processor, electrically connected to the weighing sensor and the pressure sensor, and configured to adjust an output pressure of the pressure adjusting member, and store and automatically fit the plurality of the actual pressures and the plurality of the ground pressures to establish the model for measuring the ground pressure of the seeding depth limiting wheels.

3. The device for measuring and calibrating the ground pressure of the seeding depth limiting wheels according to claim 2, wherein the processor comprises a signal amplifying circuit, an analog-to-digital (A/D) acquisition module, and a single chip microcomputer electrically connected in sequence, wherein the signal amplifying circuit is electrically connected to the weighing sensor.

4. The device for measuring and calibrating the ground pressure of the seeding depth limiting wheels according to claim 1, further comprising a lifting mechanism, arranged between the depth limiting wheels and the pressure acquisition calibrator, and configured to adjust the inclination angle between the profiling four-link mechanism and the horizontal plane.

5. The device for measuring and calibrating the ground pressure of the seeding depth limiting wheels according to claim 4, wherein the lifting mechanism comprises:
a bearing plate, located below the depth limiting wheels and abutting against the depth limiting wheels;
a pair of slide rails, located below the bearing plate;
a pair of X-shaped brackets, wherein a first end of each of the X-shaped brackets is connected to the bearing plate, a second end of each of the X-shaped brackets is connected to one of sliders, and the sliders are slidably connected to the slide rails; and
a pair of cylinders, wherein a first end of each of the cylinders is connected to one of the sliders, and a second end of each of the cylinders is connected to one of the X-shaped brackets, to adjust an inclination angle between the bearing plate and the horizontal plane.

6. The device for measuring and calibrating the ground pressure of the seeding depth limiting wheels according to claim 5, further comprising a furrow opener, connected to the main body and located between the pair of depth limiting wheels.

7. The device for measuring and calibrating the ground pressure of the seeding depth limiting wheels according to claim 6, wherein the bearing plate is provided with a hollow groove, and the furrow opener partially runs through the hollow groove and extends to below the bearing plate, so that the furrow opener is in a suspended state.

8. A method for measuring and calibrating ground pressure of a pair of seeding depth limiting wheels by using a device for measuring and calibrating the ground pressure of the seeding depth limiting wheels, said device including a main body, connected to a pair of the depth limiting wheels; a pressure adjusting member, arranged on the main body and configured to adjust a pressure of the depth limiting wheels to a ground; a pressure sensor, arranged on the main body and configured to detect actual pressures output by the pressure adjusting member; and a pressure acquisition calibrator, arranged below the depth limiting wheels and abutting against the depth limiting wheels, and configured to detect ground pressures applied by the depth limiting wheels on the ground, and adjust the actual pressures output by the pressure adjusting member, wherein the pressure acquisition calibrator is electrically connected to the pressure sensor, and the pressure acquisition calibrator is further configured to store and automatically fit a plurality of the actual pressures and a plurality of the ground pressures to establish a model for measuring the ground pressure of the seeding depth limiting wheels, the method comprising:
adjusting an output pressure of the pressure adjusting member at a preset time interval;
acquiring a plurality of the actual pressures of the pressure adjusting member and a plurality of the ground pressures applied by the depth limiting wheels on the ground; and
storing the plurality of the actual pressures and the plurality of the ground pressures in an array form, and performing data fitting to establish the model for measuring the ground pressure of the seeding depth limiting wheels.

9. The method for measuring and calibrating the ground pressure of the seeding depth limiting wheels according to claim 8, wherein before the step of adjusting the output pressure of the pressure adjusting member at the preset time interval, the method further comprises:
controlling a lifting mechanism to operate, so that an inclination angle between a profiling four-link mechanism and a horizontal plane is 0°.

10. The method for measuring and calibrating the ground pressure of the seeding depth limiting wheels according to claim 8, wherein in the device for measuring and calibrating the ground pressure of the seeding depth limiting wheels, the pressure acquisition calibrator comprises:
a weighing sensor, configured to detect the ground pressure applied by the depth limiting wheels on the ground; and
a processor, electrically connected to the weighing sensor and the pressure sensor, and configured to adjust an output pressure of the pressure adjusting member, and store and automatically fit the plurality of the actual pressures and the plurality of the ground pressures to establish the model for measuring the ground pressure of the seeding depth limiting wheels.

11. The method for measuring and calibrating the ground pressure of the seeding depth limiting wheels according to claim 10, wherein the processor comprises a signal amplifying circuit, an analog-to-digital (A/D) acquisition module, and a single chip microcomputer electrically connected in sequence, wherein the signal amplifying circuit is electrically connected to the weighing sensor.

12. The method for measuring and calibrating the ground pressure of the seeding depth limiting wheels according to claim 9, wherein the device for measuring and calibrating the ground pressure of the seeding depth limiting wheels further comprises:
a profiling four-link mechanism, hingedly connected to the main body, wherein one end of the pressure adjusting member is connected to the main body, and an other end of the pressure adjusting member is hingedly connected to the profiling four-link mechanism; and
a levelness detector, arranged on the profiling four-link mechanism, and configured to detect an inclination angle between the profiling four-link mechanism and a horizontal plane.

13. The method for measuring and calibrating the ground pressure of the seeding depth limiting wheels according to claim 12, wherein the device for measuring and calibrating the ground pressure of the seeding depth limiting wheels further comprises a lifting mechanism, arranged between the depth limiting wheels and the pressure acquisition calibrator, and configured to adjust the inclination angle between the profiling four-link mechanism and the horizontal plane.

14. The method for measuring and calibrating the ground pressure of the seeding depth limiting wheels according to claim 13, wherein the lifting mechanism comprises:
a bearing plate, located below the depth limiting wheels and abutting against the depth limiting wheels;
a pair of slide rails, located below the bearing plate;
a pair of X-shaped brackets, wherein a first end of each of the X-shaped brackets is connected to the bearing plate, a second end of each of the X-shaped brackets is connected to one of sliders, and the sliders are slidably connected to the slide rails; and
a pair of cylinders, wherein a first end of each of the cylinders is connected to one of the sliders, and a second end of each of the cylinders is connected to one of the X-shaped brackets, to adjust an inclination angle between the bearing plate and the horizontal plane.

15. The method for measuring and calibrating the ground pressure of the seeding depth limiting wheels according to claim 14, wherein the device for measuring and calibrating the ground pressure of the seeding depth limiting wheels further comprises a furrow opener, connected to the main body and located between the pair of depth limiting wheels.

16. The method for measuring and calibrating the ground pressure of the seeding depth limiting wheels according to claim 15, wherein the bearing plate is provided with a hollow groove, and the furrow opener partially runs through the hollow groove and extends to below the bearing plate, so that the furrow opener is in a suspended state.

\* \* \* \* \*